No. 684,706.                    A. J. MUNDY.                    Patented Oct. 15, 1901.
SYSTEM OF SIGNALING.
(Application filed Apr. 5, 1901.)
(No Model.)
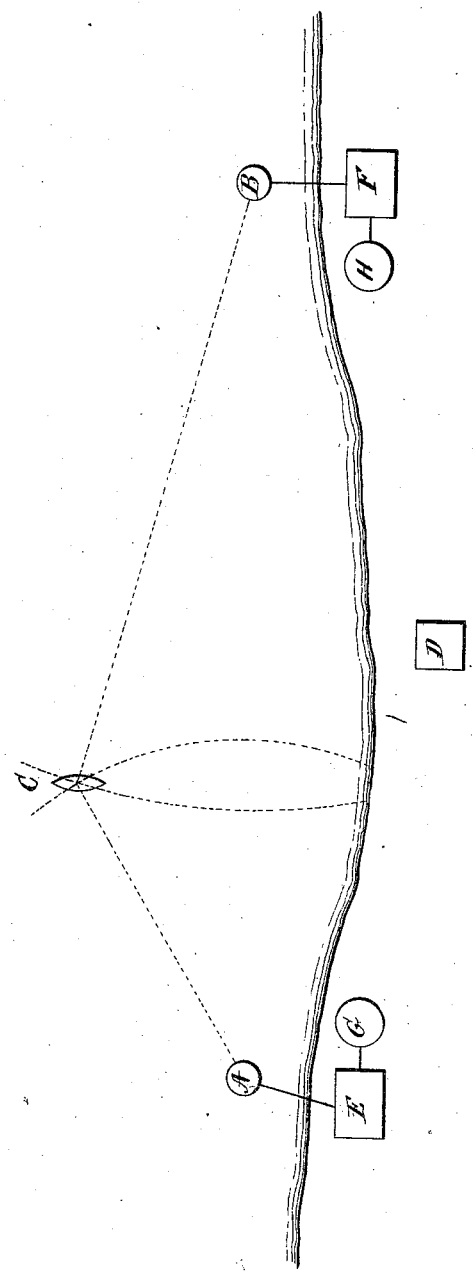
WITNESSES:
INVENTOR:
Arthur J. Mundy.

UNITED STATES PATENT OFFICE.

ARTHUR J. MUNDY, OF BOSTON, MASSACHUSETTS, ASSIGNOR TO GRAY TELEPHONE COMPANY, OF WATERVILLE, MAINE, AND BOSTON, MASSACHUSETTS, A CORPORATION OF MAINE.

SYSTEM OF SIGNALING.

SPECIFICATION forming part of Letters Patent No. 684,706, dated October 15, 1901.

Application filed April 5, 1901. Serial No. 54,419. (No model.)

*To all whom it may concern:*

Be it known that I, ARTHUR J. MUNDY, a citizen of the United States, residing at Boston, in the county of Suffolk and State of Massachusetts, have invented a new and useful Improvement in Systems of Signaling, of which the following is a full, clear, and exact description, reference being had to the accompanying drawing, forming a part of this specification, in explaining its nature.

The invention relates to an improvement in the system or art of signaling, which combines means for sending and receiving instantaneous signals with means for actuating and receiving progressive or traveling signals. For the instantaneous-signaling means I employ wireless telegraphy and the apparatus which is used for sending and receiving its impulses or signals. For the progressive signals I employ sound created in air or water in any desirable way. The sound-signals may be simultaneously started at the moment that the instantaneous signals are used or at a predetermined interval of time before or after such use of the instantaneous signals. I prefer, however, that they be started simultaneously with the instantaneous signals, using in operative conjunction with the sound-producing means a wireless receiver adapted to be actuated upon receipt of the instantaneous signals to release the means for operating the sound-signals.

While I have illustrated my invention as applied to a system which involves the use of submarine sound-signals, I do not confine myself to such use.

I will illustrate its submarine use as follows: Suppose a ship to be approaching the coast and it were to be signaled from the shore by my system. It would receive two signals, one an instantaneous electric signal from the ordinary wireless telegraphy and the other a sound-signal from a submerged bell or other sound-producing device, and there would thus be delivered to the ship in successive order two signals of essentially different character, preferably simultaneously actuated, one of which reaches the observer upon the ship instantly and the other at a known rate of speed. The observer upon the ship by noting the lapse of time between the receipt of the two signals can ascertain the distance of the ship from the charted location of the sound-signal, just as by counting the seconds between a flash of lightning and a peal of thunder the distance of the flash is known. Two or more sound-signals separated, say, several miles can be used as well as one, and these enable the observer on the ship to determine his distance from each of them in the manner above described, and with the difference in time of their receipt he will be able to determine the exact position of the ship upon a chart by simply drawing two circles thereon, one for each charted location of the two sound-signals, the radius in each case representing the distance ascertained by the time interval between the wireless electric signal and the receipt of the sound-signals through the water, and the position of the ship will be where these two circles intersect.

I will now describe my invention more in detail by reference to the drawing, where I have represented it diagrammatically in a single figure.

A and B are two submerged bells or sound-producing devices having electrically-operated striking mechanism.

D is a shore-station containing the ordinary wireless-telegraphy apparatus.

C is the ship, having receiving apparatus for wireless telegraphy and the sound-receiver for hearing the sound impulses from bells A and B.

E and F are stations containing dynamos for operating striking mechanisms attached to submerged bells A and B and connected with the same by submarine cables, as shown. They also contain wireless-telegraphy receivers which control the delivery of the electric currents for actuating the striking mechanism of the bells A and B. When station D sends out a signal, its action is threefold. At the same instant the signal is received on board the ship C it is also received at stations E and F, closing a circuit at each of these stations, which causes the electromechanisms attached to the submerged bells A and B to strike simultaneously. When the observer on the ship receives the electric signal from station D, he knows that sound-signals from A and B have at the same instant started to travel toward the ship through the water at the rate of four thousand seven hundred and twelve feet per second. By noting the time interval between he finds that it has taken the sound-signal from A just four seconds to reach him, while the sound-signal from B has in like manner taken eight seconds to reach him. Therefore he is four times four thousand seven hundred and twelve feet from A and eight times four thousand seven hundred and twelve feet from B. Finding with the pencil-compass the proper measure of the lesser distance on his chart, he describes a circle, using point A as a center, and in like manner he draws another circle around the point B, the radius being ascertained by the greater distance. Where these two circles intersect fixes the position of the ship. Bells A and B if rung simultaneously declare their identity by a difference in pitch, or if this is not desirable they may be rung successively, in which case they declare their identity by ringing given numbers—as, for instance, bell A a single stroke and bell B a double stroke.

In addition to the submarine sound-signals there may be used atmospheric sound-signals—such as steam-whistles, sirens, or metal diaphragms vibrated by magnetic lines of force. G and H indicate such atmospheric sound-signals. They are also set in action at station D in the same manner as the submarine signals and at the same instant, so that the observer on board ship may also take the time intervals between the instantaneous electric signals and the atmospheric sound-signals and determine his position by the same method as with the submarine sound-signals, bearing in mind, however, that each second in the water means only four thousand seven hundred and twelve feet, while in the air it means eleven hundred feet. When it is desirable to operate E and F independently, it may be readily done by well-known devices now used to confine the effect of the transmitter at station D to any one of several receivers at distant points. The number of sound-producing stations like E and F that can be controlled by wireless telegraphy from station D is practically unlimited. Thus any number of submarine sound-signaling devices or atmospheric sound-signaling devices, or both, installed along a sea-coast many miles in length can all be sounded at the same instant of time from a single central wireless-telegraphy station D. It is manifest that this method of signaling is a very desirable one and that it can be practiced without the employment of expensive cable or other connections between stations.

Having thus fully described my invention, I claim and desire to secure by Letters Patent of the United States—

1. The method or system of signaling herein described, the same comprising the transmission of an instantaneous signal by wireless telegraphy from a main or sending station to a receiving-station and the transmission of a progressive signal from a sending-station to the same receiving-station started at the same time or at a known interval of time with respect to the time of the instantaneous signal.

2. The method or system of signaling herein described, the same comprising the transmission of an instantaneous signal by wireless telegraphy from a main or sending station to two or more signal-operating stations and the transmission of one or more progressive signals from one or more of said operating-stations to a receiving-station at the same time or at a known interval of time with respect to the time of the instantaneous signal.

3. The method or system of signaling herein described, the same comprising the transmission of an instantaneous signal by wireless telegraphy from a main or sending station to a receiving-station and the transmission of one or more progressive signals from their sending-stations to the same receiving-station, the said progressive signals being automatically set in action by the instantaneous signal.

4. The method or system of signaling herein described, the same comprising the transmission of an instantaneous signal by wireless telegraphy from a main or sending station to a receiving-station and the transmission of progressive signals of two rates of progression from a sending-station to the same receiving-station started at the same time or at a known interval of time with respect to the time of the instantaneous signal.

5. The method or system of signaling from shore to objects at sea or removed from the shore or vice versa, the same comprising the transmission of an instantaneous signal by wireless telegraphy from a main or sending station D to a receiving-station C separated from the main or sending station D by water, and the transmission of one or more progressive signals from a sending-station D or stations E and F to the same receiving-station started at the same time or at a known interval of time with respect to the time of the instantaneous signal.

6. The method or system of signaling herein described, the same comprising the transmission of an instantaneous signal by wireless telegraphy from a main or sending station to a receiving-station, which stations are separated by water, and the transmission of a progressive signal from a sending-station through the water to the same receiving-station started at the same time or at a known interval of time with respect to the time of the instantaneous signal.

7. The method or system of signaling herein described, the same comprising the transmission of an instantaneous signal by wireless telegraphy from a main or sending station to a receiving-station separated from it by water, and the transmission of a progressive signal from a sending-station over the water to the same receiving-station started at the same time or at a known interval of time with respect to the time of the instantaneous signal.

8. The method or system of signaling herein described, the same comprising the transmission of an instantaneous signal by wireless telegraphy from a main or sending station D to a receiving-station C separated from it by water, and the transmission of one or more progressive signals from a sending-station E through the water to the same receiving-station C, and the transmission of one or more progressive signals from a sending-station over the water to the same receiving-station, said progressive signals being started at the same time with respect to the time of the instantaneous signal.

9. The method or system of signaling herein described, the same comprising the transmission of an instantaneous signal by wireless telegraphy from a main or sending station to a receiving-station, separated from the main station by water, and the transmission of a progressive signal from a sending-station to the same receiving-station, which progressive signal is started by the instantaneous signal.

ARTHUR J. MUNDY.

Witnesses:
F. F. RAYMOND, 2d,
JOHN E. R. HAYES.